United States Patent Office 2,749,287
Patented June 5, 1956

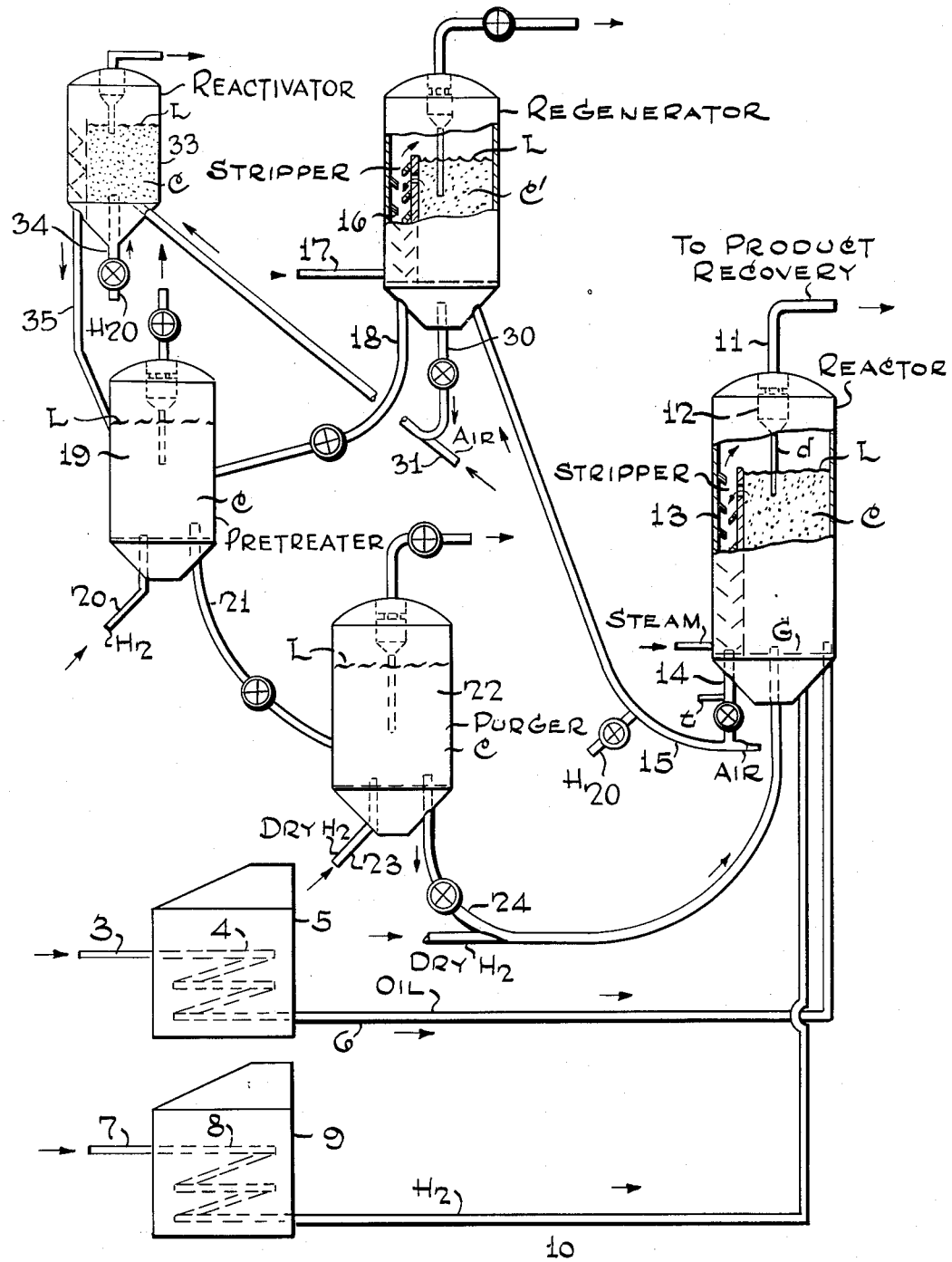

2,749,287

REACTIVATION OF HYDROFORMING CATALYSTS USING DRY AIR

Isidor Kirshenbaum, Union, N. J., assignor to Esso Research and Engineering Company, a corporation of Delaware Application October 3, 1952, Serial No. 313,017

7 Claims. (Cl. 196—50)

The present invention relates to improvements in the hydroforming and aromatization of hydrocarbons. In particular, the present invention relates to revivification of the catalyst employed in hydroforming or aromatizing hydrocarbons.

Hydroforming is an operation carried out at elevated temperatures and pressures in the presence of a solid catalytic material in which a naphthene-containing naphtha feed is treated in the presence of added hydrogen containing gas under the said conditions. The main reaction involved is one in which the naphthenes are dehydrogenated to form the corresponding aromatics. However, other reactions occur, including hydrocracking of paraffins, isomerization of paraffins to form isoparaffins, and some cyclization of paraffins, followed by dehydrogenation of the cyclic compounds thus formed to yield further quantities of aromatics.

Aromatization, on the other hand, is an operation carried out at elevated temperatures in the presence of a solid catalytic material, in which paraffins are cyclicized and thereafter dehydrogenated. Naphthenes are also converted to aromatics during the aromatization process. The process is carried out in the presence of added hydrogen, but at substantially lower pressures than normally employed in the hydroforming process.

The catalysts employed in the hydroforming operation are usually supported metals of the platinum group or supported oxides of the VI group of the periodic system, preferably, molybdenum oxide on an active form of alumina.

The aromatization process is generally carried out in the presence of supported oxides of the VI group of the periodic system, preferably, chromium oxide.

Alumina in some form is customarily employed as the spacing agent or support for the hydroforming and aromatizing catalyst. The alumina may be associated with a minor amount of silica in the case where it is used as a support for the VI group metal oxides. ZnO or $ZrO_2$ may also be added to the alumina. In the hydroforming operation, a minor amount of silica may also be included in the composition of the base alumina in the case where the active catalyst is platinum or palladium. In the latter type quite good results are obtained by including a fluoride such as hydrogen fluoride in minor amounts in the catalyst composition.

The present invention is directed more particularly to the hydroforming or the aromatization of hydrocarbons using the fluidized catalyst technique, and as previously indicated, has particular reference to the reactivation of the catalyst following its use in the onstream step of the process comprising the reaction step and the catalyst regeneration step.

During the reactions previously referred to, namely, the hydroforming of naphthenic-containing naphthas, or the aromatization of paraffins and naphthene fractions, the catalyst becomes contaminated with carbonaceous deposits which accumulate on the catalyst to the extent that its activity is impaired. This happens in spite of the fact that the hydrocarbon feed is mixed with added hydrogen during the conversions referred to. Consequently, it is necessary to treat it with a regeneration gas to remove these carbonaceous deposits, and thus restore the activity of the catalyst. Normally this regeneration restores catalyst activity to a sufficiently high level for efficient operation in the reactor. However, after extended use, the catalyst loses activity and this activity cannot be restored by conventional regeneration or even high temperature regeneration with dry air. Moreover, a hydroforming or aromatization catalyst, such as $Cr_2O_3$ on $Al_2O_3$ is deactivated when excessive water enters or is formed in the reactor or during "pretreatment." This loss in activity cannot be restored by conventional regeneration or even by high temperature treatment with dry air.

In reactivating a deactivated catalyst, the present invention proposes treating or regenerating the fouled catalyst with an oxygen-containing gas, such as air at elevated, but under carefully controlled conditions of temperature. The regenerated catalyst is then treated at elevated temperatures with air containing a carefully controlled amount of water. After another treat with dry air, the catalyst is submitted to a carefully controlled pretreatment with $H_2$ containing gases as described below.

The present invention in particular provides means for extending the life of the catalyst of the type herein described. In other words, in many chemical reactions where a solid catalyst is employed which becomes fouled with carbonaceous deposits and requires periodic regeneration, while the initial activity of the catalyst may be high, such catalysts, in many instances, lose activity after an extended period of time onstream, and this initial activity is not restorable by conventional methods of regeneration. This applies to the presently described catalysts. For example, it has been found that conventional catalysts employed in hydroforming and aromatization which are employed in successive cycles of onstream and regeneration phases, decrease in activity as these cycles are repeated a large number of times. According to methods hereinafter described, the present invention provides means for regeneration of the catalyst of the character herein described to extend the catalyst life, that is to say, to maintain the catalyst at a high activity level after a prolonged series of cycles comprising onstream and regeneration phases.

An object of this invention is to provide an improved method of reactivating hydroforming and aromatization catalysts.

Another object of this invention is to provide a method for regenerating and reactivating catalysts of the character herein described under conditions such that the catalyst will have a long life.

Another object of the present invention is to provide a method for attaining improved yields of desired hydrocarbons in the process wherein hydrocarbons are hydroformed or aromatized through the agency of an improved regeneration and reactivation technique.

It has been found that water has a deactivating effect on the catalyst in the reaction zone, and as the present description proceeds, data will be presented to show that during the regeneration and pretreatment of the catalyst, it is treated in such a manner that when the regenerated and pretreated catalyst is returned to the onstream phase of the operation, it is substantially free of water. By "pretreatment" one means, treating a catalyst such as supported $MoO_3$ or $CrO_3$ following regeneration with an oxygen containing gas, to partially reduce the $MoO_3$ or $CrO_3$ prior to its return to the reaction zone.

In the accompanying drawing there is shown, diagrammatically, the essential parts or elements of an apparatus in which the present invention may be carried into effect.

Referring in detail to the drawing, 1 represents a reactor containing a bed of powdered catalytic material in the form of a dense fluidized solid extending from a grid or other gas distributing means G to an upper dense phase level L. Above L there is disposed a light or dilute phase suspension of catalyst in gasiform material.

Hydrocarbon is fed to the system through line 3, is then forced through suitable heating means which may be, for example, a fired coil 4 disposed in a suitable furnace setting 5, wherein the oil is heated and vaporized and thereafter conducted via line 6 into the bed of catalyst C in reactor 1. Meanwhile, hydrogen-containing gas in line 7 is forced through a suitable heating means, which may comprise a fired coil 8 disposed in a furnace 9 where it is heated and then passed via line 10 into reactor 1, as indicated.

Preferably, the oil and the hydrogen-containing gas are separately introduced into reactor 1. The reason for this is that the hydrogen-containing gas is usually heated to a considerably higher temperature than the oil feed, and if they are mixed prior to entry into the bed of catalyst, there is some danger of undesirable thermal cracking of the feed oil.

It should also be pointed out, although not shown in the drawing, that the oil in line 3 is not cold oil, but is preferably preheated by heat interchange with the hot products of the reaction. The same is true of the hydrogen-containing gas which is recycled from the product recovery system and given a preliminary heating by interchange with the said hot products of the reaction.

With respect to the catalyst in reactor 1, it is pointed out that this should be ground to particle size such that it is adapted for good fluidization. Thus, the catalyst should have the following particle size distribution:

|  | Percent by weight |
|---|---|
| 0–20 microns | 0–15 |
| 20–40 microns | 10–30 |
| 40–80 microns | 30–50 |
| 80–200 microns | 15–60 |

Furthermore, in order to provide a fluidized bed of catalyst in reactor 1, the oil vapors and the hydrogen-containing gas should be caused to flow through the catalyst bed C at a superficial velocity (i. e., a velocity measured as though there were no catalyst) of from about ½ to 1½ feet per second. Under conditions of temperature, pressure and contact time more fully set forth hereinafter, the desired conversion occurs in reactor 1, and the crude product admixed with the hydrogen is recovered overhead via line 11. Before passing from the reactor, the gasiform material is caused to flow through one or more gas-solids separating devices 12, wherein entrained catalyst is separated from the gasiform material and returned to the dense phase C through one or more dip pipes d. The crude product is separated from hydrogen which latter is recycled, as required to line 7. The liquid product is distilled to recover a hydroformate in a conventional manner.

Referring again to the catalyst in reactor 1, as stated previously, this catalyst acquires coke deposits as the reaction proceeds, and therefore, it is necessary to withdraw this catalyst from the reaction zone subject to regeneration. Toward this end, the catalyst in bed C is charged to a baffled stripping zone 13 wherein it is treated with a gas, such as steam, $N_2$, flue gas, recycle gas to dislodge volatile material whereupon the catalyst is withdrawn through an aerated standpipe 14 and charged to line 15 in which a current of air is contained. The catalyst is dispersed in the air and carried into a regenerator 16 wherein it is formed into a dense fluidized bed C' similar to the fluidized bed in reactor 1. In the regenerator the catalyst is treated with the air in a manner more fully explained hereinafter. The regenerated catalyst is charged to a baffled stripping zone 16 wherein it is treated with an inert gas, such as nitrogen, flue gas, etc. injected at the bottom of said stripper through line 17, the stripping gas serving to remove oxygen-containing gas. The regenerator is similar in construction, although generally smaller than reactor 1, and is provided with "cyclones" or similar devices (not shown) to remove catalyst from the gases and/or vapors exiting overhead. The stripped catalyst is withdrawn from the regenerator 16 through an aerated standpipe 18 and charged to a "pretreater" 19, wherein again, it is formed into a dense, fluidized bed by an upflowing gas, this time a hydrogen-containing gas, charged to the bottom thereof through a line 20. This pretreatment of the catalyst effects a partial reduction of the chromia or molybdena which is oxidized during the regeneration.

The pretreated catalyst is withdrawn from pretreater through an aerated standpipe 21 and charged to a purging vessel 22 wherein it is treated with a dry gas, such as light hydrocarbon gas, dry hydrogen, flue gas, nitrogen, etc., the purpose being to drive off water from the catalyst and to insure that it be substantialy free of water as it is returned to the reaction zone. This gas is fed to the purging vessel 22 from line 23. The dried catalyst is withdrawn from vessel 22 through an aerated standpipe 24 and charged into the oil stream in line 6 for return to the reaction zone.

For simplicity in some instances in the above description of the apparatus shown in the drawing, known details have been omitted as, for example, a recitation in the description of the mode of operation of the several vessels containing the catalyst, of the use of gas distributing means, the use of cyclones to separate catalyst from fines about to pass from the vessel etc.

As pointed out previously, the present invention relates to reactivation of the catalyst which might have been deactivated as a result of continuous use in the multiplicity of cycles comprising onstream and regeneration phases, or an upset in the reaction due to the inclusion of water in the gasiform material in the reactor. This deactivation of the catalyst would, of course, be reflected in the yields of the desired aromatics. To explain this point further, it is pointed out that with fresh catalyst and a reaction zone substantially anhydrous or at least substantially free from extraneous water, the operation may proceed under normal conditions of operation and regeneration for an extended period of time. But after, say, a month of continuous operation, the catalyst usually becomes deactivated and it is not restored to its original activity by regeneration with an oxygen-containing gas, such as air, or diluted air. In this situation, this invention reactivates the catalyst, in other words, restores it to its substantially original activity by two steps as follows:

(1) Reactivating the catalyst at high temperatures, first, with moist air at temperatures within the range of from 1150°–1200° F., and then with dry air, and (2) Removing water from the reactivated catalyst before it is returned to the reaction zone.

One of the most important features of the present invention is for the production of benzene from $C_6$ virgin naphtha. As pointed out previously, one of the features of the present invention which results in improved results has to do with maintaining a dry reaction zone, and the effectiveness of this operation is shown in the below table:

*Effect of water in feed on catalyst activity*

[1020° F.; 0 p. s. i. g.; 2/1 $H_2$/HC mole ratio.]

| Feed Stock | n-Hexane | | Isomerate II [1] | | |
|---|---|---|---|---|---|
| Water (on feed) Mole Percent | 0 | 6.2 | 0 | 1.15 | 6.2 |
| Yield: | | | | | |
| Aromatics, vol. percent | 49 | 35 | 43 | 33 | 23 |
| Carbon, wt. percent | 1.0 | 0.9 | 3.6 | 3.5 | 3.7 |

[1] A narrow $C_6$ hydrocarbon cut subjected to a previous isomerization to convert methylcyclopentane to an equilibrium amount of cyclohexane. The composition of this feed is: 30.1% methylpentane, 47.7% n-hexane, 7.6% methylcyclopentane, 9.8% cyclohexane, 4.3% benzene, and 0.5% dimethylpentanes.

It will be noted that the presence of water very definitely and severely decreases the yield of desired aromatics. This loss in activity is not restored even after water is removed from the reactor. Accordingly, care must be taken when stripping the catalyst with steam or $CO_2$ containing gases to remove all water from the catalyst prior to the pretreating or return to the reaction zone.

Now, with respect to the loss in activity of the catalyst, there is set forth in the foregoing tabulation that a catalyst which has lost activity as indicated by the decrease in yields of aromatics cannot be restored by ordinary regeneration or by regeneration, followed by high temperature heating in dry air.

*Loss in catalyst activity*

| Feed Stock | Isomerate II | | n-Hexane | |
|---|---|---|---|---|
| | Vol. Percent Aromatics | Wt. Percent Carbon | Vol. Percent Aromatics | Wt. Percent Carbon |
| Fresh Catalyst | 43 | 3.6 | 49 | 1.0 |
| After Water Deactivation Ordinary regenerations [1] | 38 | 3.6 | 44 | 0.9 |
| Regenerations+3 hrs. dry air at 1,125° F | 34 | 3.6 | 39 | 0.5 |
| Regenerations+5 hrs. dry air at 1,200° F | 38 | 3.6 | 40 | 0.7 |

[1] Carbon on cat. burned off in air at 1,100° F. and catalyst then treated with air at 1,050° F. for 1 hour.

This situation is serious since in a fluid operation even with efficient pretreatment of the catalyst and efficient stripping, water can get into the reactor, especially in the case of an upset ($H_2O$ in reactor). A similar loss in activity is often obtained after extended use of the catalyst, even in the absence of $H_2O$ in the reactor.

It has now been found that the activity of the catalyst can be fully restored by treating the deactivated catalyst after regeneration, first, with air containing small amounts of water at temperatures of 1150°–1200° F. and then with dry air. The treatment with moist air is necessary since, as seen above, even several regenerations followed by two dry air treatments at temperatures between 1125° and 1200° F. for a total of well over eight hours did not restore the original activity. The effect of this air treatment in the present of water vapor is shown in the following data:

*Restoring of catalyst activity*

| Feed Stock | Isomerate II | | n-Hexane | |
|---|---|---|---|---|
| | Vol. Percent Aromatics | Wt. Percent Carbon | Vol. Percent Aromatics | Wt. Percent Carbon |
| Fresh Catalyst | 43 | 3.6 | 49 | 1.0 |
| Regenerated Catalyst after 5 hrs. treatment in wet air (3 mole percent $H_2O$) at 1,175° F. followed by 4.5 hrs. dry air at 1,175° F | 44 | 3.8 | 47 | 0.9 |

These data show that a catalyst deactivated so that, say, the aromatic production drops from 43% to 38% can be reactivated by regenerating the catalyst, and then treating with moist air and then with dry air under the conditions set forth in this invention.

This treatment with water vapor can be carried out in situ in the regenerator, externally in another vessel, etc. The catalyst can be treated in the temperature range of 950°–1400° F. but the preferred temperature range is 1150°–1250° F. The amount of water vapor in the air can be varied over a wide range but 1–5 mole percent is a convenient concentration which gives good results.

The water adsorbed on the catalyst after treatment can be removed by treatment with dry air, nitrogen, methane and the like. This reactivation treatment while described for alumina-chromia catalysts can also be applied with advantage to silica-chromia, zinc aluminate-chromia, zirconia-chromia, etc. catalysts. It also reactives alumina-molybdena type catalysts, especially those which have been deactivated by excessive water in the pretreater or reactor.

In order further to explain this invention, the following disclosure is set forth:

In order to maintain maximum catalyst activity, the following revivification steps must be controlled carefully: (1) regeneration and oxidation, and (2) hydrogen pretreat and purge to remove water.

1. *Regeneration and oxidation.*—The catalyst must be regenerated at temperatures of 1150° to 1300° F., the preferred range being 1175°–1250° F. The need for the high temperature regeneration is shown by the following batch fluid data. It was found that the alumina-chromia catalyst lost activity when it was regenerated for several cycles at 1100° F. but regained its high activity when oxidized at 1200° F.

*Effect of calcination temperature*

| Feed | n-hexane | |
|---|---|---|
| Regeneration Temp., ° F | [1] 1,100 | [2] 1,200 |
| Yield of Aromatics, vol. percent | 37 | 44 |

[1] Cycle 13-catalyst regenerated at 1,100 ° F. for 12 cycles.
[2] Cycle 19.

The oxidation of the catalyst should be carried out in air although mixtures of air and an inert diluent such as $N_2$ can be used during the initial phases of the oxidation. The gas rate is such as to maintain proper fluidization, e. g. linear velocities of 0.2–1 ft./sec.

$H_2$ *pretreatment and purge.*—This step is very critical in fluid operation. Inadequate reduction or removal of water by the purge results in a marked decrease in catalyst activity. The adverse effect of water on catalyst activity is shown by the following data obtained with a naphtha containing 47.7 and n-hexane; 30.1% methylpentanes; 7.6% methylcyclopentane; 9.8% cyclohexane; 4.3% benzene; and 0.5% dimethylpentane.

*Effect of water on catalyst activity*

[22% $Cr_2O_3$ catalyst; 1025° F.; 0.2 w./w./hr.; 0 p. s. i. g.]

| Mole percent $H_2O$ (on feed) | Yield of Aromatics, vol. percent (on feed) |
|---|---|
| 0 | 43 |
| 1 | 33 |
| 6 | 23 |

It has been found that the amount of water that has to be removed from the catalyst during reduction and purge, for maintenance of good activity, is related to (1) the amount of chromia on the catalyst; (2) the amount of catalyst circulated to the reactor per unit time, and (3) the amount of oil fed to the reactor per unit time. The amount of water removable by an extensive reduction and purge at 1000°–1150° F. from an alumina gel base catalyst containing 20–25% $Cr_2O_3$ is given by the following relationship:

1. $$M = 0.0206WC$$

$M$ = moles of water removed
$W$ = kilograms of catalyst reduced and purged extensively
$C$ = percent chromium as $Cr_2O_3$ (all other oxide components considered as oxides)

The minimum amount of water that must be removed for maintenance of good catalyst activity is given by the following relationship:

2. $\qquad S = 0.0206 W'C(1 - 0.00263F)$ $S$ = moles of water removed from catalyst entering reactor per hour
$W'$ = kilograms of catalyst entering reactor per hr.
$C$ = percent chromium as $Cr_2O_3$
$F$ = moles of feed entering reactor per hour Removal of substantially less than the amount of water calculated by means of Formula 2 decreases the yield of aromatics by more than 5% in a continuous regenerative fluid process. Although the above formulas were derived for catalysts containing 20–25% $Cr_2O_3$, they may be used without serious error for similar catalysts containing 15–35% $Cr_2O_3$ or even more $Cr_2O_3$.

EXAMPLE

A fluid unit was operated with a light naphtha feed having an average molecular weight of 84. The oil feed rate was 840 gm. per hour, and the catalyst to oil weight ratio 5/1. The catalyst used had the composition: 71% $Al_2O_3$—4.5% $SiO_2$—22% $Cr_2O_3$—1.8% $K_2O$—0.7% $Ce_2O_3$. Applying Formula #2, it is found that 33.2 gm. of water have to be produced from the catalyst entering the reactor each hour if high catalyst activity is to be maintained. Reduction and purge experiments showed that the catalyst required 2.3 hours of reduction and purge to remove 33.2 gm. of water when using a gas velocity of 235 liters per hour per kilogram of catalyst. Consequently, the fluid unit had to be equipped with a pretreatment section having a hold-up of about 9.7 kilograms of catalyst.

The need for a thorough purge is also shown by the following data obtained in a batch fluid operation with a linear velocity of 0.2–0.3 ft./sec. and 235 volumes of hydrogen and purge gas per hour per 1000 gms. of catalyst.

*Effect of inadequate reduction and purge*

| Reduction plus Purge Time (hours) | Percent of Removable Water Remaining on Catalyst |
|---|---|
| 0.25 | 45 |
| 0.5 | 30 |
| 1 | 15 |
| 2 | 10 |
| 5 | 2 |

The effect of incomplete reduction and purge on catalyst activity can be seen from the following data for a fluid process with a catalyst to oil weight ratio of 5 fed to the reactor.

*Effect of incomplete reduction and purge*

| Percent of Removable Water Remaining on Catalyst | Yield of Aromatics, Vol. Percent |
|---|---|
| 0 | 43 |
| 10 | 30 |
| 20 | 26 |
| 30 | 23 |

EXAMPLE

The following yields of aromatics have been obtained in a fluid aromatization process with properly revivified catalysts:

| Feed Stock | Hexane naphtha fraction [1] | | | n-hexane |
|---|---|---|---|---|
| Temp., °F | 1,045 | 1,045 | 1,045 | 1,035 |
| Feed Rate, w./w./hr. | 0.13 | 0.15 | 0.20 | 0.15 |
| Aromatics, vol. percent | 31 | 30 | 28 | 44 |
| Carbon, wt. percent | 4–6 | 4–6 | 4–6 | 0.2 |

[1] Fraction contained: 31.5% methylpentanes, 40.8% n-hexane, 16.4% methylcyclopentane, 4.1% cyclohexane, 4.9% benzene, 0.6% dimethylpentane and 1.7% dimethylbutane.

EXAMPLE

An 88 vol. percent yield of gasoline was obtained from a light naphtha fraction upgraded over a properly revivified catalyst to an 88 Res. O. N.

The specific catalysts mentioned previously are merely illustrative and any other known hydroforming catalysts may be employed together with promoters. In each case, it is preferable to support the chromia or other aromatizing or hydroforming catalysts on a suitable carrier, such as alumina. Also, the operating conditions may be varied somewhat from those given hereinbefore. For example, the following tabulation is set forth for operating conditions in the reaction zone:

| | |
|---|---|
| Temperature | 800°–1150° F., preferably, 900°–1050° F. |
| Pressure | 0–1000 pounds, preferably, 0–300. |
| Feed rate v./v./hr. | 0.1–5, preferably 0.2–3. |
| Cubic feet of hydrogen per bbl. of oil. | 0–10,000 cubic feet, preferably, 2000–5000. |
| Concentration of hydrogen in recycle gas. | 50–100%, preferably, 50–80%. |

To recapitulate briefly, the present invention relates to reactivation or rejuvenation of a hydroforming or aromatizing catalyst which has lost its activity, or had the same seriously impaired so that it does not respond to conventional regeneration. According to this invention the coke-free catalyst of lowered activity is treated with moist air containing small controlled amounts of water, followed by treatment with dry air. The catalyst reactivation may be carried in regenerator 16 or in a separate zone or zones (not shown). The precautions indicated hereinbefore must be observed particularly in respect to steaming of the catalyst wherein the off-gas must never contact reactor catalyst, and in like manner, pretreated catalyst must be freed of water.

It is an important aspect of this invention that the naphtha undergoing hydroforming or aromatization may be under partial vacuum or under a partial pressure less than atmospheric. As herein referred to "coke" relates to the carbonaceous deposits on the catalyst. Also as hereinbefore indicated, regeneration, properly so-called refers to coke removal from spent catalyst, whereas, reactivation or rejuvenation refers to restoring the activity of a low activity catalyst which is coke-free.

Many modifications of the invention will be apparent to those who are skilled in the art without departing from the spirit thereof.

What is claimed is:

1. In the method of upgrading naphthas in the matter of octane rating, comprising subjecting the naphtha to the influence of a group VI metal oxide catalyst in a reaction zone at elevated temperatures and pressures for a sufficient period of time to effect the desired conversion in an operation in which operation carbonaceous deposits are formed on the catalyst, and which catalyst is withdrawn from the reaction zone and subjected to regeneration by treatment with an oxygen-containing gas to remove the said carbonaceous deposits, the improvement which comprises restoring the activity of the catalyst when its activity is not restorable by conventional oxidative regeneration by first treating the catalyst substantially free of carbonaceous deposits with an oxygen-containing gas also containing water, thereafter treating the substantially coke free catalyst with a dry oxygen-containing gas, thereafter treating the catalyst with a hydrogen-containing gas to effect a partial reduction of said catalyst, purging the catalyst with a gas to free it from water and thereafter returning the reactivated catalyst to the reaction zone.

2. The method set forth in claim 1 in which the water content of the oxygen-containing gas is from about 1–5 volume per cent.

3. The method set forth in claim 1 in which the amount of water removed from the catalyst during the hydrogen treatment is not less than that given by the formula:

$S = 0.0206\ W'C\ (1 - 0.00263\ F)$ where $S$ = moles of water removed from catalyst entering reactor per hour
$W'$ = kilograms of catalyst entering reactor per hour
$C$ = per cent chromium as $Cr_2O_3$
$F$ = moles of feed entering reactor per hour.

4. The method set forth in claim 1 in which the naphtha fraction is a normal hexane rich fraction.

5. The method set forth in claim 1 in which the catalyst is chromium oxide on alumina.

6. The method set forth in claim 1 in which the catalyst is reactivated at a temperature of from 1150°–1300° F.

7. The method set forth in claim 1 in which the naphtha-fraction contains a substantial quantity of naphthenes which are converted to the corresponding aromatics in the reaction zone.

References Cited in the file of this patent

UNITED STATES PATENTS

| | | |
|---|---|---|
| 2,457,566 | Krieger et al. | Dec. 28, 1948 |
| 2,546,031 | Hanson | Mar. 20, 1951 |
| 2,606,878 | Haensel | Aug. 12, 1952 |